A. BALLOCA.
FRICTION CLUTCH MECHANISM FOR AUTOMOBILES AND FOR OTHER APPLICATIONS.
APPLICATION FILED JAN. 18, 1906.

934,264.

Patented Sept. 14, 1909.

Witnesses
J. M. Stymbook
H. A. Totten.

Inventor
Alberto Balloco.
By
Knight Bros
Attorney

UNITED STATES PATENT OFFICE.

ALBERTO BALLOCA, OF TURIN, ITALY, ASSIGNOR TO COMPANY ITALA, FABBRICA DI AUTOMOBILI, OF TURIN, ITALY.

FRICTION-CLUTCH MECHANISM FOR AUTOMOBILES AND FOR OTHER APPLICATIONS.

934,264.   Specification of Letters Patent.   Patented Sept. 14, 1909.

Application filed January 18, 1906. Serial No. 296,730.

*To all whom it may concern:*

Be it known that I, ALBERTO BALLOCA, a subject of the King of Italy, and resident of Turin, Italy, have invented certain new and useful Improvements in Friction-Clutch Mechanism for Automobiles and for other Applications, of which the following is a specification.

In the clutch mechanism forming the subject of the present invention, is applied the principle of friction developing between several plane surfaces, alternately mounted upon the motor shaft and on the transmission shaft when they are pressed against each other.

The invention is represented in the accompanying drawing in which—

Figure 1:
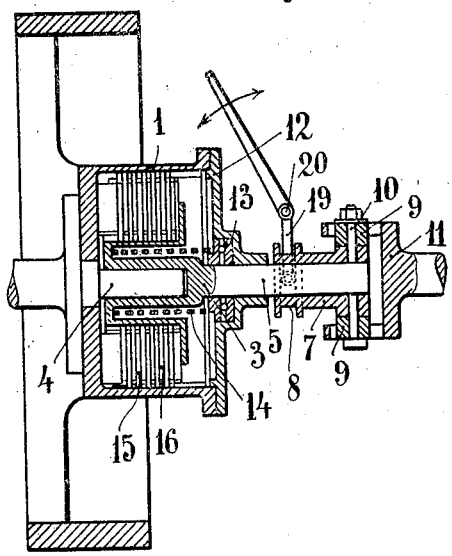
Figure 3:
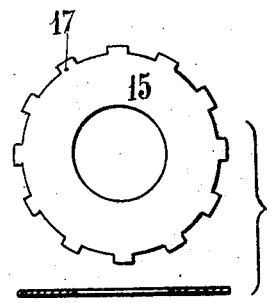
Figure 2:
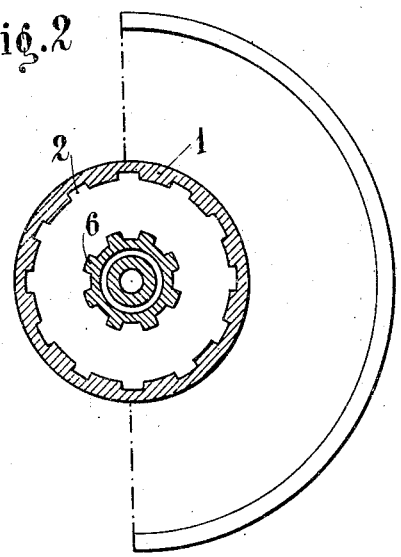
Figure 4:
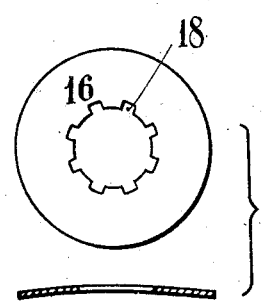

Figure 1 is a longitudinal axial section of the clutch mechanism, Fig. 2 is a transverse section of the drum with half of the fly wheel, Figs. 3 and 4 are face view and section of one plate of each of the two series.

This clutch mechanism is composed of a drum 1 (Fig. 1) in one with the fly wheel of the motor; upon the interior surface of this drum are arranged numerous grooves 2, similar to key ways. In the interior of this drum is the sleeve 3 (Fig. 1) formed of two concentric cylinders connected together at one end by a web portion and having a flange on the other end of the outer cylinder. This sleeve rotates upon the spindle 4 (which forms a continuation of the motor crank shaft) and is terminated by the shaft 5. This sleeve 3 is provided with numerous projections 6 in the form of keys. Fixed to the end of shaft 5 is the T-bracket 7 which is provided with the grooved collar 8 and the two rollers 9 rotating upon the pivot bolt 10; these two rollers engage in the slots formed in the piece 11, forming the head of the transmission shaft. With this arrangement the entire sleeve 3 can be made to move a certain distance axially and further it can in consequence of the articulation formed by the movable rollers and the grooves, form a small angle with the transmission shaft without injuring the proper transmission of the motion, so that it can adapt itself to the elastic deformations of the chassis of the car.

The drum 1 is hermetically closed by the cover 12. Against this cover through the intermedium of the ball bearing 13, bears one end of the spring 14 the other end of which latter bears against the bottom of the sleeve 3.

The clutch mechanism is completed by the two series of plates 15, 16 (Figs. 3 and 4). The plates 15 (Fig. 3) are formed with projections 17 which engage in the grooves formed in the drum 1; the plates 16 (Fig. 4) are formed with grooves 18 in which engage the projections or keys, formed on the sleeve 3. The plates of one series are mounted alternately with those of the other, and consequently any two consecutive plates are fixed the one to the motor shaft and the other to the transmission shaft, while they can all move slightly in the axial direction. All these plates are pressed against each other by the spring 14 which forces the sleeve 3 constantly against them. The pressure of this spring 14 creates between the plates such a friction that, when all has been exactly calculated, it is sufficient to transmit the power of the motor shaft to the transmission shaft. If the action of the spring 14 is reduced by slightly moving the sleeve 3 in the direction of the axle (toward the right hand of Fig. 1) the pressure between the plates will cease and with it the transmission of power will cease. Motion is given to the sleeve 3 by moving the lever 19 on its axis 20, said lever being engaged in the grooved collar 8. But as for the good working of the clutch mechanism it is necessary that it contains a certain quantity of oil, it happens that even when pressure between the plates is caused to cease, a certain adhesion continues to be maintained between them and the transmission of the motion does not completely cease. To obviate this inconvenience, the plates are made of an elastic material and those of one series (say for example that of 16, Fig. 4) are bent slightly in such manner as to form a cylindrical surface, so that when they become flat by pressure there is a tendency to resume their cylindrically bent form as soon as the pressure is removed which causes them to become detached from those of the other series, viz 15.

It is useful to observe that in the clutch apparatus forming the subject of the present invention: 1st. It is the sleeve 3 carrying the plates 16 which by being moved axially produces itself the transmission of power or the stoppage of such transmission; the number of pieces and consequently the weight is thus reduced to a minimum. 2nd. The spring 14, by bearing at one end against the cover of the drum and at the other against the sleeve 3, which by the intermedium of the disks or plates bears against the bottom of the drum, does not exert any effort on the shafts. 3rd. By the curved form of the plates is obtained not only their complete detachment from each other in the unclutching position, but this separation is very easily and very regularly made, because it is not produced all at once upon the entire surface of the plates.

Claims.

1. In a friction clutch mechanism, the combination of flat frictional disks alternated with cylindrically-bent disks.

2. In a friction clutch mechanism, the combination with the driving and driven shafts; of a plurality of flat frictional disks rotated by one of said shafts; and a plurality of cylindrically-bent disks rotated by the other shaft and adapted to be flattened against the flat disks during the operation of clutching.

The foregoing specification signed at Turin Kingdom of Italy this fifth day of January 1906

ALBERTO BALLOCA.

In presence of—
GOTTARDO C. PICONI,
F. LIMONI.